Figure 3:
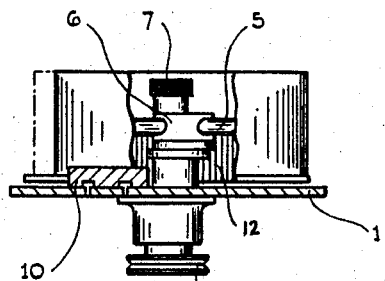

Dec. 8, 1959     M. S. SPRINGATE     2,916,188
HOPPER-TYPE APPARATUS

Filed Sept. 28, 1953     2 Sheets-Sheet 1

Inventor
Maurice S. Springate
By Ralph B. Stewart
Attorney

Dec. 8, 1959  M. S. SPRINGATE  2,916,188
HOPPER-TYPE APPARATUS
Filed Sept. 28, 1953  2 Sheets-Sheet 2

Inventor
Maurice S. Springate
By Ralph B. Stewart
attorney.

United States Patent Office 2,916,188
Patented Dec. 8, 1959

2,916,188

HOPPER-TYPE APPARATUS

Maurice Stanley Springate, Oaklands, England, assignor to Aviation Developments Limited, Welwyn Garden City, Herts, England, an English joint-stock company Application September 28, 1953, Serial No. 382,737

Claims priority, application Great Britain September 29, 1952

7 Claims. (Cl. 221—163)

The invention relates to a hopper type apparatus for feeding light articles, for example, headed tubular rivets, on to an inclined guide, from which the rivets travel by gravity.

One object of the invention is to provide a high output hopper device in which such small articles may be oriented and delivered at a comparatively high speed.

Another object of the invention is the provision of a high output hopper which ensures such delivery of accurately machined articles, for example, countersunk tubular rivets having a feathered edge, without noticeable damage.

According to the invention, a hopper for receiving, orienting and delivering rivets or other small elongated articles comprises a rotary tubular portion mounted for rotation about an axis passing through it and normal to a first inclined upper face of a base portion by which the tubular portion is effectively closed at its lower end except for one or more delivery grooves in the base portion extending downwardly from within the tubular portion, the distance, radially of the axis of rotation, of the inner surface of the tubular portion from said axis being different at different points around its circumference, and the delivery groove(s) in the base portion being open at the upper face of the base portion within the tubular portion and the width of said groove(s) being greater than the width but less than the length of the articles to be oriented and delivered.

In the case of headed rivets or articles, the width of the delivery groove, or each of them, will be less than that of the head but greater than that of the remainder of the rivets or articles, in which case, the stem of each article will depend into the groove and be suspended by its head parallel to its neighbour in the groove.

Alternatively, especially when the rivets or articles are not headed, the depth of the groove may be just sufficiently easy to accommodate an article longitudinally so that the articles will travel end to end along the groove.

The inner curved surface of the tubular portion may be circular and eccentric of the rotation axis or it may be otherwise unequally distant from the rotation axis, for example, it may be oval, so long as in consequence of this and of the rotation of the tubular portion the rivets are repeatedly raised against gravity and allowed to fall again under the influence of gravity over the face of the base portion to enter and pass along the delivery grooves as each arrives in the desired orientation.

Preferably the delivery groove, or each of them, extends upwardly along the base portion to the lower part of the tubular portion, in the direction in which the rivets or other articles tend to fall over the face of the latter under the influence of gravity, and, passing under the wall thereof at that side which moves downwardly when rotating, said groove extends at an angle of, say, forty-five degrees to said direction, passing along said base plate below said rotation axis and terminates within and at that side of the tubular portion which moves upwardly when rotating.

Preferably also a fixed baffle, extends from the face of the base portion within the tubular portion above the axis of rotation and substantially parallel with and above the open groove(s) within the tubular portion, so that the rivets or other articles are carried against it as the tubular portion rotates.

In order to retain the rivets or other articles in the groove or grooves after they have left the tubular portion, the latter for part of its length, at least from its lower end, may be externally circular and concentric about the rotation axis and a cover plate or guard member may be secured to the base portion to enclose the otherwise open grooves and with its upper end fitting closely to the externally circular part of the tubular portion.

If desired, the inner surface of the tubular portion may be ribbed or fluted or otherwise formed to assist in raising the rivets or other articles and, whether or not this be the case, it may be covered or lined with rubber or other cushioning material as may also the baffle member, where provided.

A preferred form of the invention will now be described with reference to the accompanying drawings.

Figure 1:
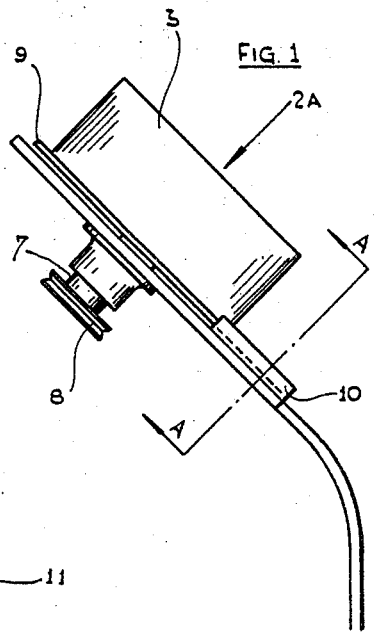
Figure 2:
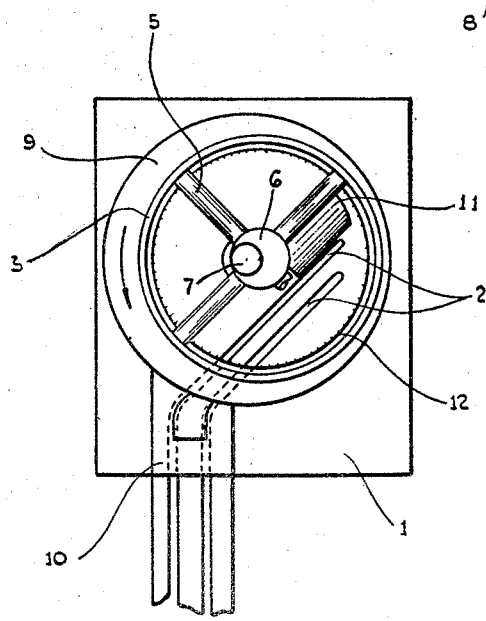
Figure 4:
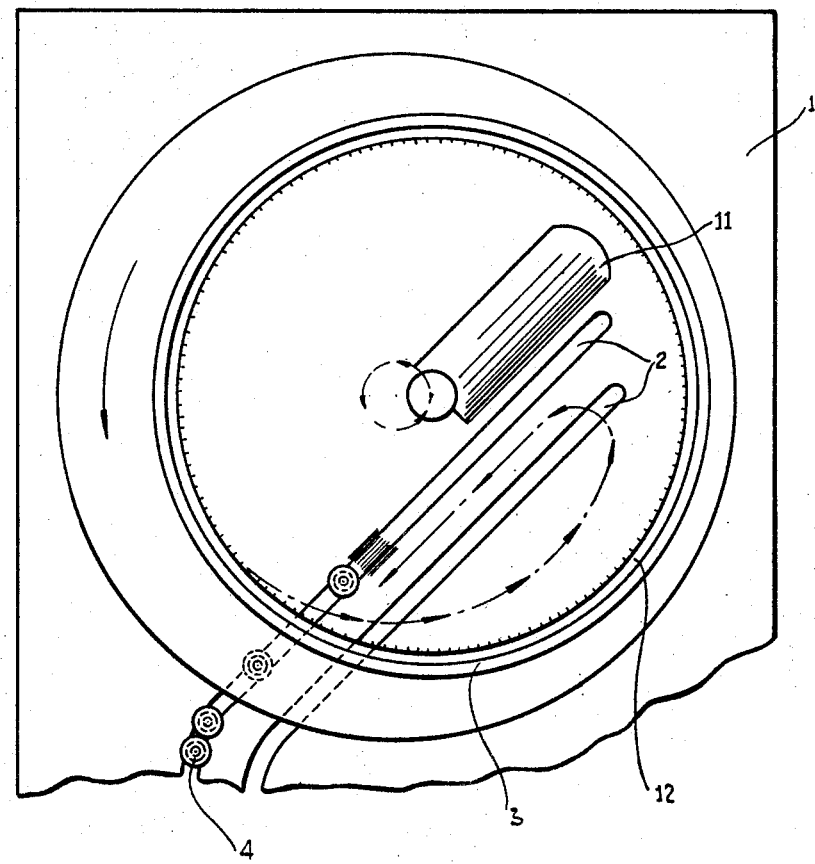

Figure 1 is a view in side elevation of the hopper apparatus according to the invention, Figure 2 is a view of Figure 1 by orthographic projection as seen from the direction of the arrow 2A, Figure 3 is a sectional view of Fig. 1 by orthographic projection as seen from the line A—A and showing a portion of the hopper broken away, Figure 4 is a diagrammatical plan illustrating the path of the rivets when the hopper is in motion.

The hopper type apparatus comprises a rectangular base plate 1 which is set with its longitudinal axis at an angle of approximately 45° to the horizontal. This base plate 1 is formed with two delivery grooves 2 which are disposed at an angle of approximately 45° to the longitudinal axis of the base plate 1. Positioned on the base plate 1 over the upper parts of the delivery grooves 2, is a sort tube 3 of sufficiently large diameter to receive a quantity of rivets 4 or other articles. This tube 3 is secured to four spokes 5 radially projecting from an accentric boss 6 formed on the outer end of a driven shaft 7 extending through the base plate 1 at an angle of 90 degrees. On the other end of the shaft 7 and underneath the base plate 1 is mounted a pulley 8 usually driven through a transmission belt from an electric motor (not shown). The tube 3 is formed with an eccentric external flange 9 at its lower edge which rotates concentrically with the driven shaft 7 whilst the tube 3 rotates eccentrically thereto. A guard or cover 10 is placed over the grooves 2 at a point adjacent to the revolving hopper tube 3 and is curved to fit closely to the eccentric flange 9 of the tube 3.

A baffle 11 or similar stop is provided on the base plate 1 within the tube 3 and extends along and just above the delivery grooves 2; this baffle, as will be later described, diverts the swirling rivets 4 towards the feed grooves 2.

At a point where the feed slots leave the perimeter of the hopper tube 3 they are curved to form an included angle of about 135 degrees. The internal wall of the tube is partially covered by a fluted rubber lining 12.

In use the rivets are piled into the tube 3 of the hopper and the tube 3 is rotated. The eccentric motion of the tube 3 causes the mass of rivets to swirl in intermittent and wave form, whilst the fluted rubber lining of the hopper tube 3 tumbles the rivets 4 on the outer edge of the mass. The up and down swirling motion of the rivets 4 takes place in a closed path which assumes the shape of the letter D, as shown in Figure 4. The rivets in contact with the lower portion of the hopper wall move to the right and upwardly along the curved portion of the closed path, and then return to the starting point along the straight portion of the closed path by rolling down the surface of plate 1. As shown in Figure 4, the straight portion of the closed path is above and substantially in line with the delivery grooves 2 in the base plate 1. This D shape flow is assisted by the baffle 11. A further aid to free delivery is effected by the eccentricity of the hopper tube 3 causing an oscillating movement at a point where the rivets 4 leave the hopper tube 3. The direction of this oscillating movement being in line with the grooves 2 prevents any tendency for the rivets 4 to jam by moving the mass of rivets alternately backwards and forwards in line with the delivery grooves 2. This permits any rivets 4 which are correctly oriented to fall clear immediately of the hopper tube 3 and down the delivery grooves 2.

From the above, it will be seen that the delivery grooves or passageways 2 formed in the base plate 1 enter the tubular member 3 at a lower portion thereof (preferably at a point where the wall of the tubular member is moving downwardly), and extend upwardly over the face of the base plate within the tubular member and are inclined into that area of the plate where the articles accumulate in a mass under the rotary movement of the tubular member.

I claim:

1. Apparatus for orienting and delivering articles from a heterogeneous mass of such articles comprising, a flat base plate mounted with its longitudinal axis inclined to the horizontal by an angle sufficient to cause such articles to roll down the surface of said plate, a tubular hopper member mounted above said base plate and having the lower end thereof effectively closed by said base plate, rotary means mounting said tubular hopper for rotation about an axis normal to the plane of said plate, whereby articles contained within said hopper are caused to move over the surface of said plate in a closed path having a curved portion extending from the bottom portion of the hopper upwardly and in the direction of rotation of said hopper and then returning along a substantially straight portion to the bottom portion of the hopper, said base plate having at least one open-slot delivery passageway formed in the upper face thereof and extending beneath the wall of said tubular hopper member at a lower portion thereof, said open-slot passageway extending upwardly over the face of said plate and being inclined in the direction of movement of the lower portion of the hopper wall and being substantially parallel with and located below the straight portion of the closed path of movement of said articles.

2. Apparatus according to claim 1 wherein said open-slot passageway passes under the wall of said tubular member at a point where said wall is moving downwardly and terminates at a point in the upper half of said tubular member and adjacent a point where the wall of the tubular member is moving upwardly.

3. Apparatus according to claim 1 and including a fixed baffle member mounted on said base plate within said tubular member and arranged above and substantially parallel with said open-slot delivery passageway.

4. Apparatus according to claim 1 wherein the inner surface of said tubular member is fluted to assist in raising said articles on the surface of said inclined base plate.

5. Apparatus according to claim 1 wherein the inner surface of said tubular member is covered with a material which provides cushioning of the articles against the wall of the tubular member and increases the friction between the articles and the tubular member.

6. Apparatus according to claim 1 wherein said tubular hopper is provided at its lower end with an external flange, the outer periphery of which is concentric with the axis of rotation of the hopper, and the open-slot passageway formed in said base on the outside of said hopper is covered by a guard member secured to the base and having close fitting relation with the outer periphery of said flange.

7. Apparatus according to claim 1 wherein said tubular hopper member is mounted for rotation on an axis which is eccentric with respect to its perimeter, whereby articles contained within said hopper are caused to move over the surface of said plate in an oscillating movement.

References Cited in the file of this patent

UNITED STATES PATENTS

| | | |
|---|---|---|
| 181,540 | Sawyer | Aug. 29, 1876 |
| 562,572 | Carpenter | June 23, 1896 |
| 594,617 | Goodkind | Nov. 30, 1897 |
| 619,247 | Barker | Feb. 7, 1899 |
| 2,538,706 | Reynolds | Jan. 16, 1951 |
| 2,588,787 | Wright | Mar. 11, 1952 |
| 2,715,978 | Sterling | Aug. 23, 1955 |

UNITED STATES PATENT OFFICE
CERTIFICATE OF CORRECTION

Patent No. 2,916,188                                December 8, 1959

Maurice Stanley Springate

It is hereby certified that error appears in the printed specification of the above numbered patent requiring correction and that the said Letters Patent should read as corrected below.

Column 1, line 32, for "first" read — flat —; column 2, line 42, for "sort" read — short —; lines 44 and 45, for "accentric" read — eccentric —.

Signed and sealed this 14th day of June 1960.

(SEAL)
Attest:

KARL H. AXLINE
Attesting Officer

ROBERT C. WATSON
Commissioner of Patents